(12) United States Patent
Rugg

(10) Patent No.: US 9,045,696 B2
(45) Date of Patent: Jun. 2, 2015

(54) SYSTEM AND METHOD FOR PURIFYING SOLID CARBONIFEROUS FUELS, USING A ROTARY CHAMBER, PRIOR TO CHEMICAL LOOPING COMBUSTION

(76) Inventor: Peter Rugg, New York, NY (US)

( * ) Notice: Subject to any disclaimer, the term of this patent is extended or adjusted under 35 U.S.C. 154(b) by 480 days.

(21) Appl. No.: 13/450,267

(22) Filed: Apr. 18, 2012

(65) Prior Publication Data

US 2013/0277198 A1    Oct. 24, 2013

(51) Int. Cl.
| | |
|---|---|
| C10J 3/00 | (2006.01) |
| F27B 7/00 | (2006.01) |
| C10B 53/02 | (2006.01) |
| C10B 57/04 | (2006.01) |
| C10B 57/10 | (2006.01) |
| F23K 1/00 | (2006.01) |
| F23K 1/04 | (2006.01) |
| C10L 5/04 | (2006.01) |
| C10L 5/44 | (2006.01) |
| C10L 9/08 | (2006.01) |

(52) U.S. Cl.
CPC .............. *C10B 53/02* (2013.01); *C10B 57/04* (2013.01); *C10B 57/10* (2013.01); *F26B 2200/02* (2013.01); *F23K 1/00* (2013.01); *F23K 1/04* (2013.01); *F23C 2900/99008* (2013.01); *F23K 2201/10* (2013.01); *F23K 2201/30* (2013.01); *F23K 2900/01001* (2013.01); *Y02E 50/14* (2013.01); *Y02E 50/32* (2013.01); *C10L 5/04* (2013.01); *C10L 5/44* (2013.01); *C10L 9/08* (2013.01); *Y02E 50/10* (2013.01); *Y02E 20/346* (2013.01); *Y02E 50/30* (2013.01)

(58) Field of Classification Search
CPC ................ F27B 7/00; F27B 7/20; C10J 3/48; C10J 3/005
See application file for complete search history.

(56) References Cited

U.S. PATENT DOCUMENTS

| | | | | |
|---|---|---|---|---|
| 1,916,900 | A * | 7/1933 | Vandegrift et al. | 201/9 |
| 3,990,865 | A * | 11/1976 | Cybriwsky et al. | 48/197 R |
| 4,273,619 | A * | 6/1981 | Angelo, II | 202/211 |
| 4,274,344 | A * | 6/1981 | Nider | 110/346 |
| 4,378,974 | A * | 4/1983 | Petit et al. | 48/197 R |
| 4,591,362 | A * | 5/1986 | Yudovich et al. | 48/197 R |
| 4,983,214 | A * | 1/1991 | Bottinelli et al. | 75/387 |
| 5,851,246 | A * | 12/1998 | Bishop et al. | 48/122 |
| 6,005,149 | A * | 12/1999 | Bishop | 585/241 |

* cited by examiner

*Primary Examiner* — Matthew Merkling

(57) ABSTRACT

Solid carboniferous fuels contain varying quantities of moisture, mercury, chlorine, nitrogen, sulfur, heavy metals and other materials that attain vapor pressure at elevated temperatures. The cost effective removal of these degrading and sometimes hazardous materials is important to the further use of the fuel for combustion via chemical looping to prevent contamination of the oxygen carrier medium. The solid fuel is cut, shredded, ground or sieved to appropriate size, and heated in a chamber that can exclude oxygen and air thus preventing ignition. The unwanted materials are driven in the gaseous state and extracted for recycling or safe disposal. The solid fuel cleaned of pollutants exits the chamber and is cooled below ignition temperature prior to contact with oxygen. The solid fuel thus purified is more appropriate for combustion via chemical looping.

2 Claims, 6 Drawing Sheets

SYSTEM AND METHOD FOR PURIFYING SOLID CARBONIFEROUS FUELS, USING A ROTARY CHAMBER, PRIOR TO CHEMICAL LOOPING COMBUSTION

CROSS-REFERENCE TO RELATED APPLICATIONS

Related to Application 12-908061

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention relates to the general topic of clean fuels for use in future combustion. The need for clean fuels is urgent to prevent further worldwide air pollution by harmful contaminants inherently present in nearly all carboniferous fuels. These contaminants, if not removed from the fuel feed stock are either released upon combustion, or costly to remove after combustion. Typical fuels are coal and the hydrocarbons that can be released from coal, and numerous calorific biomass species such as grass, wood, algae, farm waste and peat to mention the most common. Since many of the contaminants are harmful to all forms of life, a considerable effort has been undertaken over the last several decades to find ways to release and capture these contaminants prior to combustion. Some of these contaminants can then be re-processed for useful commercial purposes while some must be sequestered or safely disposed of in other ways. The present invention provides novel means for releasing and capturing most of the inherent contaminants prior to utilization in combustion thereby giving rise to a more efficient and less costly way for obtaining a contaminant free fuel. By removing water vapor and other contaminants such as mercury (Hg), chlorine (Cl), sulfur (S), arsenic (As) and the like, a more efficient combustion process can take place to cause the resulting energy production to be cheaper, less polluting and more efficient.

BACKGROUND OF THE INVENTION

Coal and biomass combustion has occurred for several millennia. However, commercial upgrading of combustion through the addition of combustion catalysts, increased oxygen or chemical oxidation of hydrocarbons became more widespread in the mid to late twentieth century and early twenty-first century. Combustion is the reaction of oxygen combining with carbon and hydrogen in the fuel in an exothermic reaction. Briefly, combustion catalysts are additives to the fuel that seek to generate more complete combustion of the hydrocarbons, or reduce problems with ash or emissions in the flue gas. Increased oxygen, oxygen over firing, or oxy-combustion all seek to increase the proportion of oxygen above the 20% in ambient air in order to improve combustion efficiency and reduce emissions. Chemical looping combustion employs a metal oxide to deliver oxygen for a chambered combustion reaction with hydrocarbons, and then recycles the metal for oxidation prior to looping back to the fuel reaction chamber. In general, depending on the nature of the raw coal and/or biomass in addition to the exact nature of the combustion process, the emissions from coal and biomass combustion generally contain large quantities of carbon dioxide and water vapor, and smaller emissions of acid gases, compounds of chlorine, mercury, additional heavy metals, hydrogen sulfide, and a wide range of inert ash material.

The history and detailed time-line of coal clean up through pyrolysis are well documented and found on a variety of websites. Details of a pyrolysis process can be found, for example, in "Kinetic Studies of Gas Evolution During Pyrolysis of Sub-bituminous Coal," by J. H. Campbell et al., a paper published May 11, 1976 at the Lawrence Livermore Laboratory, Livermore, Calif. Numerous issued U.S. patents describe methods for the reduction of sulfur in coal, for example, U.S. Pat. No. 7,056,359 by Somerville et al. Their process involves grinding coal to a small particle size, then blending the ground coal with hydrated lime and water, followed by drying the blend at 300-400 degrees F. U.S. Pat. No. 5,037,450 by Keener et al. utilizes a unique pyrolysis process for denitrifying and desulfurizing coal. Here the sulfur and nitrogen content of coal is again driven off in gaseous form and sequestered for possible further use. Related art is described in U.S. Pat. No. 4,862,485, which teaches means for forming coal pellets by mixing coal particles with polyvinyl alcohol, calcium oxide and/or magnesium oxide and water. U.S. Pat. No. 4,738,685 teaches how to cold press coal fines with molasses, an inorganic hardening agent such as calcium carbonate, calcium phosphate, iron oxide, aluminum oxide or optionally with an acid. Additional teachings relevant, though differing from the present application can be found in U.S. Pat. Nos. 4,618,347, 4,586,936. 4,169,711 and U.S. Pat. No. 5,916,826. Patent application No. 20100162619 describes a method using a Mallard process at a pressure of 5 bar at an elevated temperature for compacting biofuels together with some limited amount of peat or lignite.

A more recent system has been proposed and published as USPTO application 20090020456 (Jan. 22, 2009) by Tsangaris et al, relating to the gasification of fossil fuels, fuels that are then used to process a variety of unconventional sources of oil sources such as tar sands and shale oil.

Additionally, in U.S. application Ser. No. 12/631,302, Lawrence F. McHugh et al instruct us in the oxidation of solid fuels via metallic oxide chemical looping, and points out that over time, minerals in the coal ash contaminate the oxygen carrier.

Chemical looping combustion ("CLC") provides for the exothermic oxidation of hydrocarbons without ignition. Most CLC systems provide two chambers and a method of transporting grains of metallic oxide from one chamber to the other and then back to the first chamber, completing the loop. Metallic oxides are chosen for the ease with which they take on or give off an oxygen atom. For example, iron oxide is found in about 12 different forms, of which FeO and $Fe_2O_3$ are two common forms. In a CLC unit, one might find iron oxide grains in one chamber and pulverized coal or biomass, ground solid hydrocarbons, in the other chamber. When air is conveyed through the first chamber, FeO is converted into $Fe_2O_3$ in an exothermic reaction taking Oxygen atoms from the air. The grains of $Fe_2O_3$ are transported into the other chamber with ground solid hydrocarbons. In this second chamber, $Fe_2O_3$ is converted to FeO in a second exothermic reaction that combines hydrocarbons with oxygen to make water, $H_2O$, and carbon dioxide, $CO_2$. The iron oxide is then returned to the first chamber to be re-oxygenated. These paired exothermic chambers give off heat energy that is useful to do work for example, by the making of steam power. A pure CLC system uses pure oxygen from the air and pure hydrocarbons. When the hydrocarbons are not purified before CLC, then minerals in the coal and biomass that result in ash, may contaminate metallic oxide that serves as the oxygen carrier and result in lost efficiency and added processing cost.

The present application describes unique and novel systems and methods for obtaining calorically rich, nearly contaminant free combustibles for chemical looping combustion consisting of coal and biomass. The invention involves the preprocessing of the coal and biomass so resulting in major energy saving during the combustion stage, and preservation of the oxygen carrier free of contamination. The biomass can consist of algae, switch grass, wood matter, such as sawdust and/or wood chips, as well as manure to mention a non-exhaustive number of useful caloric components.

One of the several ways the present invention is particularly efficient is that it recovers and recycles the water vapor that is released from coal and biomass upon heating in a typical combustor. The fuel to be combusted which has already had the water removed makes the heat transfer of combustion considerably more efficient. At the same time, other contaminants such as S, $H_2S$, Cl, Hg, As, Se and other minerals that have also been removed prior to CLC increases the efficiency and quality of the combustion process. Many of these impurities can then be recycled for further useful industrial applications. This form of recycling instead of disposal waste management is becoming recognized world wide as a necessary and achievable goal to reduce pollution and potential climate change.

The present invention is a further development of the work in the inventor's application Ser. No. 12/908,061 and is presented to make any claims different from said earlier application.

While some of the waste products from the burning of fossil fuels and biomass can be recovered or recycled, most are disposed of in landfill. This type of disposal is wasteful and in itself potentially polluting, clearly not an environmentally friendly or economical way to proceed. Various government agencies have now put laws into effect that make certain forms of this type of disposal illegal which can result in substantial fines.

SUMMARY OF THE INVENTION

The present invention describes an apparatus and method for pre-processing coal and biomass that save energy in the chemical looping combustion process. Specifically, the pre-processing kiln is attached to a water cleanup station to capture the water vapor that is released near the proximal end of the kiln. A wet scrubber is attached near the distal end of the kiln to capture pollutants and certain hydrocarbons prior to combustion. The removal of both the water vapor and the pollutants greatly reduces the cost and increases the efficiency of the chemical looping process while preserving the integrity of the oxygen carrier. Means for sizing the coal and biomass also aids in the efficiency of the combustion reaction.

DETAILED DESCRIPTION OF THE INVENTION

Figure 1:
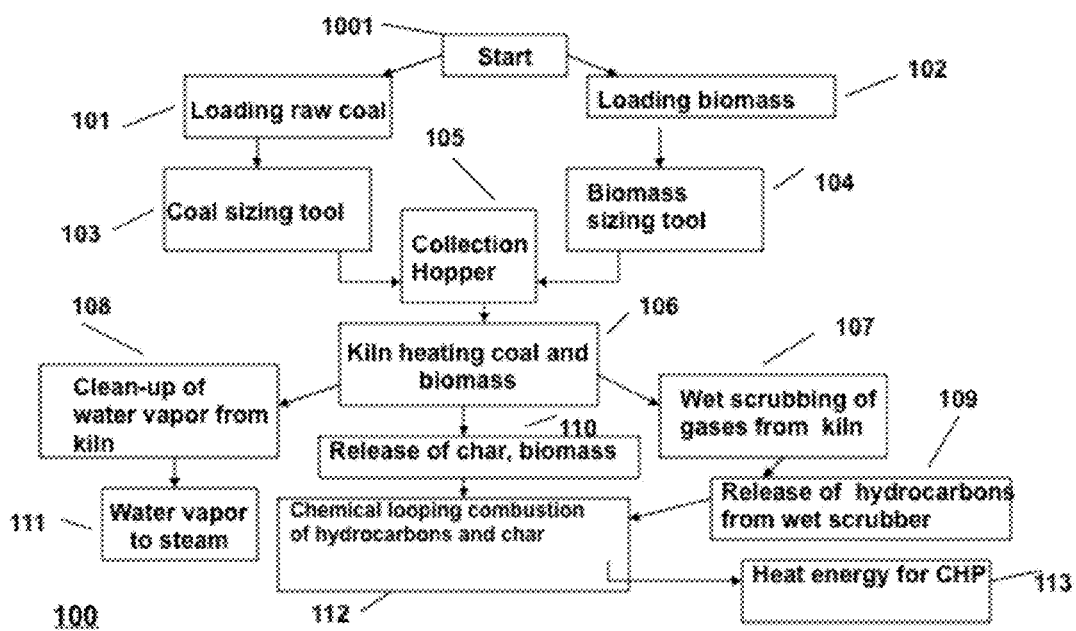
FIG. 1 is a flow diagram illustrating the successive steps required for pre-processing of biomass and coal to be brought to a clean and near contaminant-free condition for efficient chemical looping combustion.

The present invention describes a system and method for pre-processing coal and biomass prior to further use in combustion by chemical looping of an oxygen carrier. The basic components utilize, a source of coal and biomass that brings the coal to a desired size using a first sizing tool for reducing the coal to maximize efficiency, a second sizing tool to cut or shred the biomass to the optimum size for operation in the a kiln. The main objective is to remove as much water and other contaminants in the kiln prior to the step of conversion of the kiln contents. The kiln is one that has an outer shell and an inner core concentrically positioned within the outer shell, the inner core free to rotate within the outer shell. The kiln temperature is controlled by way of master control module which also controls the speed of rotation of the inner kiln core, receives signals from the thermal sensors within the kiln and regulates the oscillatory motion of the two sizing tools which operate by way of motors that causes and up and down motion of a first piston, with a perforated block to crush the coal, second piston attached to cutting blades to shred the biomass and, each crushed and shredded to their desired respective sizes. The thermal signals also are used to regulate the temperature of the kiln by way of heater coils affixed to the outer surface of the kiln outer shell.

The sized coal and biomass are directed to a hopper by way of a chute from each sizing tool, where the hopper is affixed to the proximal end of the kiln and where the proximal end has an airlock attached to the kiln inner shell so that the coal and biomass can enter the kiln without admitting oxygen to the kiln. On heating of the coal and/or biomass, water vapor is emitted and drawn off to a water cleanup station by way of a duct extending from near the kiln's proximal end. A duct is positioned near the distal end of the kiln, to evacuate gaseous contaminants such as Cl, Hg, S, Se, and As and some hydrocarbons into an activated charcoal filter or a wet scrubber which separates and sequesters the contaminants for future use or safe disposal. Any useful hydrocarbons that evolve can also be sequestered separately for further use.

Typically the master control unit controls the kiln temperature in order to maintain the proximal end of the kiln in the range 125-200 C, the distal end in the range 450-500 C. The sized coal and biomass enter the kiln's proximal end though the airlock; are heated without combusting, and exit the kiln at the distal end at the higher temperature with the help of a screw drive. The solid contents of the kiln are moved from proximal to distal end by way of a helical steel rail firmly affixed to the inner surface of the kiln core upon rotation of the kiln core.

The coal-sizing tool comprises a first container with one open end with a chute at the opposite end through which the coal exits after sizing. A centrally located first piston, has one end within the container connected to a perforated block, with the opposite end located exterior to the sizing tool container. The exterior part of the piston is connected to a first motor to cause the piston to undergo vertical oscillatory motion, by crushing the coal within the container to the desired size. The size will be determined by the rate of oscillation and the impact produced by the crusher. The coal moves from the proximal to the distal ends of the sizing tool by way of a first conveyor belt positioned at the bottom of the sizing tool container. The preferred volume of the exiting coal is in the range of $0.25$-$10$ $cm^3$.

The biomass-sizing tool comprises a second container, open at its front end with a chute attached to the opposite open end through which the biomass exits. The motion from front (proximal) to distal ends makes use of a second conveyor belt located at the bottom of the sizing tool. A second piston extends into the container with a block attached to the piston and a set of blades attached to the block. The opposite end of the piston extends outside of the container and is driven by a second motor to provide vertical oscillatory motion to the piston and thereby to the blades to produce cutting of the biomass to a preferred size, preferably in the range of $0.25$-$40$ $cm^3$.

The important novelty of the present invention is to provide a system that receives pre-processed coal and or/biomass for further oxidation or gasification where the pre-processing eliminates most water vapor from the coal and biomass as well as the contaminants. This pre-processing results in a more efficient, cost saving way to combust coal and biomass where the coal and biomass exit the kiln as a pre-heated char, substantially free of pollutants that would otherwise be more costly to remove during or after the combustion via chemical looping combustion.

Figure 2:
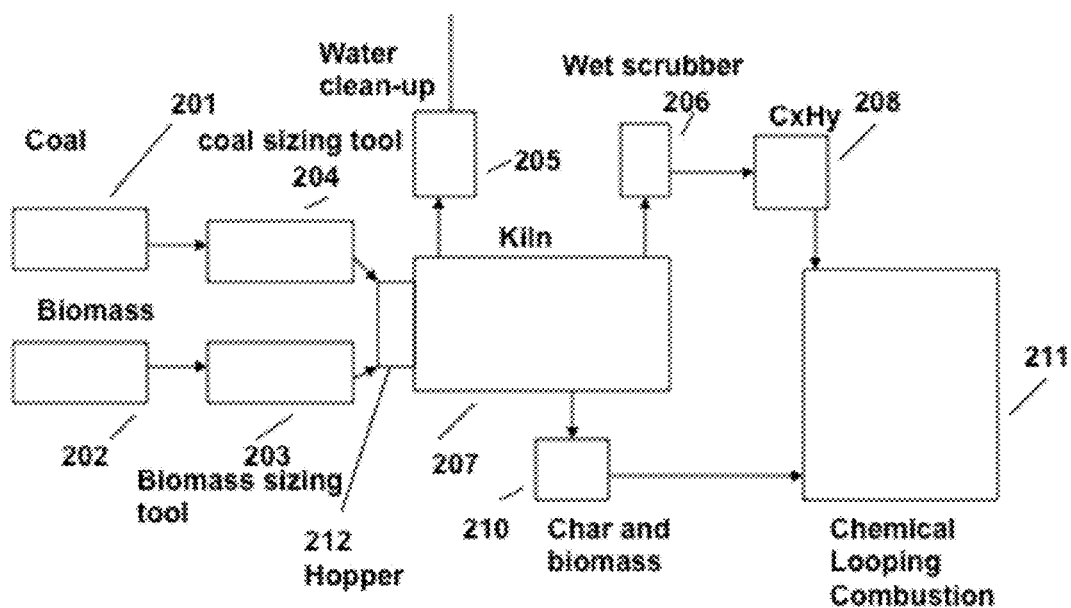
FIG. 2 is a block diagram illustrating the components of the invention and their interconnections to bring the raw coal and or biomass into a state essentially free of water vapor and pollutants for subsequent efficient chemical looping combustion.

The Invention can be further understood by referring by referring to FIG. 1 where 100 describes the steps of the process invention in conjunction with FIG. 2 which indicates the block diagram in 200. The start of the process is described in FIG. 1 and starts at 1001. This is followed by the loading 101 of coal, the loading 102 of biomass, each into their respective sizing tools to provide the desired sizes of each. The coal is crushed 103 and the biomass is cut or shredded 104. Biomass and coal are collected 105 in collection hopper 105 to be heated in heated kiln 106. Kiln heating of the coal and biomass results in the emanation of vapor and contaminants that are released from the coal and biomass in the kiln. Cleaning of the water vapor 108 from the kiln occurs in a water clean-up station while the other contaminants are introduced to an activated charcoal filter or wet scrubber and separated in step 107. Steam is generated in step 111 from the hot water vapor and recycled for other utilization. The chemical looping combustion process 112 is thus protected from contamination. Some valuable hydrocarbons initially mixed with the contaminants are released 109 from the wet scrubber and directed to be further combusted via chemical looping combustion at 112. Kiln heat also results in char formed from the hot coal as well as hot biomass, both of which are released in step 110 from the kiln and then further released to be combusted via chemical looping combustion 112.

The steps indicated in 100 are further clarified the block diagram, FIGS. 2. 201 and 202 show the initiating steps of available coal and biomass respectively. Coal 201 is fed into sizing tool 204 for obtaining a desired size of coal while biomass 202 is directed into biomass sizing tool 203. The contents of 203 and 204 are directed into hopper 212 by way of separate conveyor belts within sizing tools 204 and 203 (not shown here). Hopper 212 is fixedly attached to kiln 207 where the water vapor developed in the heated kiln near the kiln's proximal end is directed to a water clean-up station 205. Contaminants that are given off in heated kiln 207 are drawn off near the distal end of kiln 207 and directed to a wet scrubber that separates and sequesters contaminants from useful hydrocarbons of the type CxHy and directs them to a tank 208. Subsequently the contents of 208 are directed into combustor 211. The fully pre-process heated contents of kiln 207, consisting of heated biomass and char are emptied into container 210 and then sent by a conveyor belt to a chemical looping combustion chamber 211. The hydrocarbon contents of 208 are also directed into a chemical looping combustion reactor 211.

Figure 3:
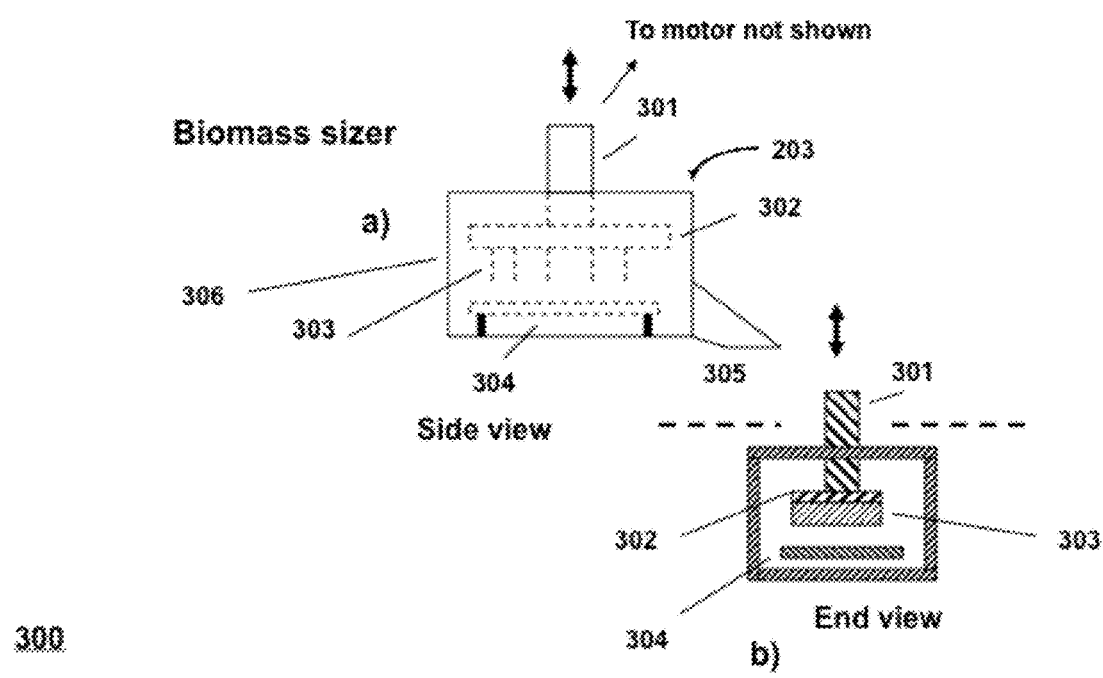
FIG. 3 illustrates a biomass sizing tool consisting of a biomass cutting/shredding device, designed to bring the biomass into a desired shape or volume for further efficient processing. A side and cross sectional end view are shown.

FIG. 3 illustrates the biomass sizing tool or sizer 203 shown here in a side view (a). The side view, shows a portion of piston 301 exterior to the sizing tool container 306, where exterior portion of piston 301 is connected to a motor (not shown) to cause 301 to move in an oscillatory motion with the lower part of piston 301 extending into the interior of container 306 and rigidly attached to block 302. Block 302 is in turn fixedly attached to cutting blades 303. A conveyor belt 304 moves the biomass from the proximal to the distal end of sizing tool 203. The distal end of 203 is attached to chute 305 for emptying the contents of the sized biomass to hopper 212 shown in FIG. 2.

FIG. 3 shows the cross sectional view (b) of the biomass sizing tool or sizer 203 with piston 301, block 302, blade 303 and belt 304. The double headed arrow indicates the up and down oscillatory motion of piston 301.

Figure 4:
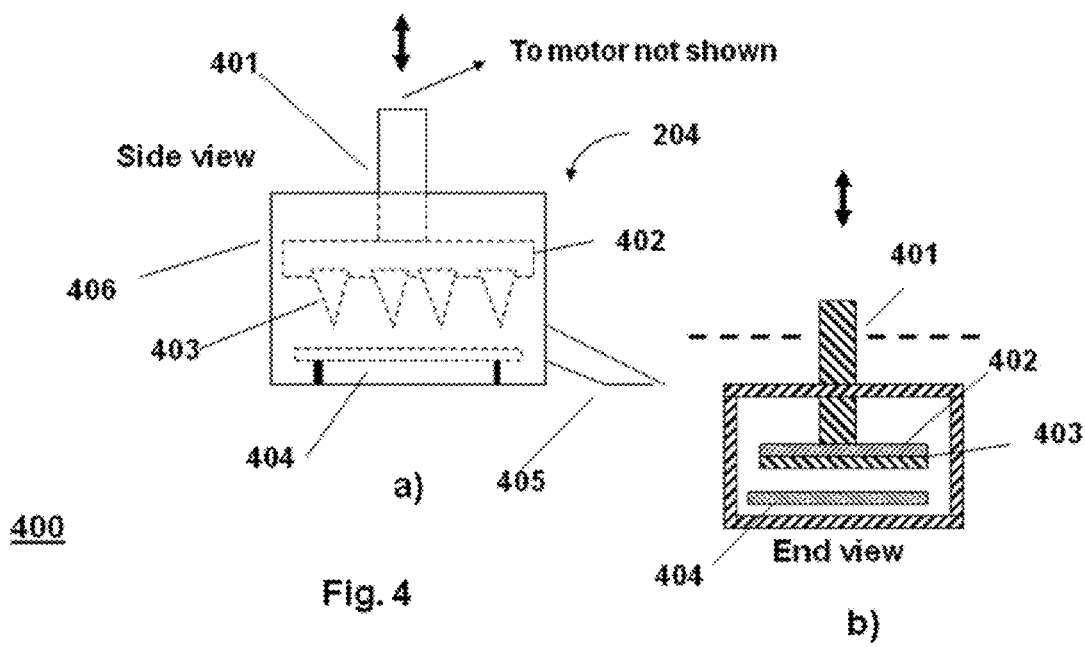
FIG. 4 is a sketch of the coal sizing tool for crushing coal, the device takes feedstock coal and crushes it to the desired shape or volume for subsequent efficient processing prior to gasification. Both a side and cross sectional end view are shown.

FIG. 4 indicated by 400 shows details of coal sizing tool 204. The side view is shown in a) of FIG. 4. A portion of piston 401 is shown outside of coal sizing tool container 406 while a portion of piston 401 extends into the interior of container 406. The end of piston 401 extending into container 406 is attached to block 402 and block 402 is attached to a crusher 403. A conveyor belt 404 moves the crushed coal from the proximal to the distal end of container 406. The distal end of 406 empties the crushed coal by way of a chute 405. The vertical arrows indicate the oscillatory motion of piston 401. A cross sectional end view of the coal sizing tool is shown in b) of FIG. 4 with piston 401, block 402 and crusher 403 as well as conveyor belt 404.

Figure 5A:
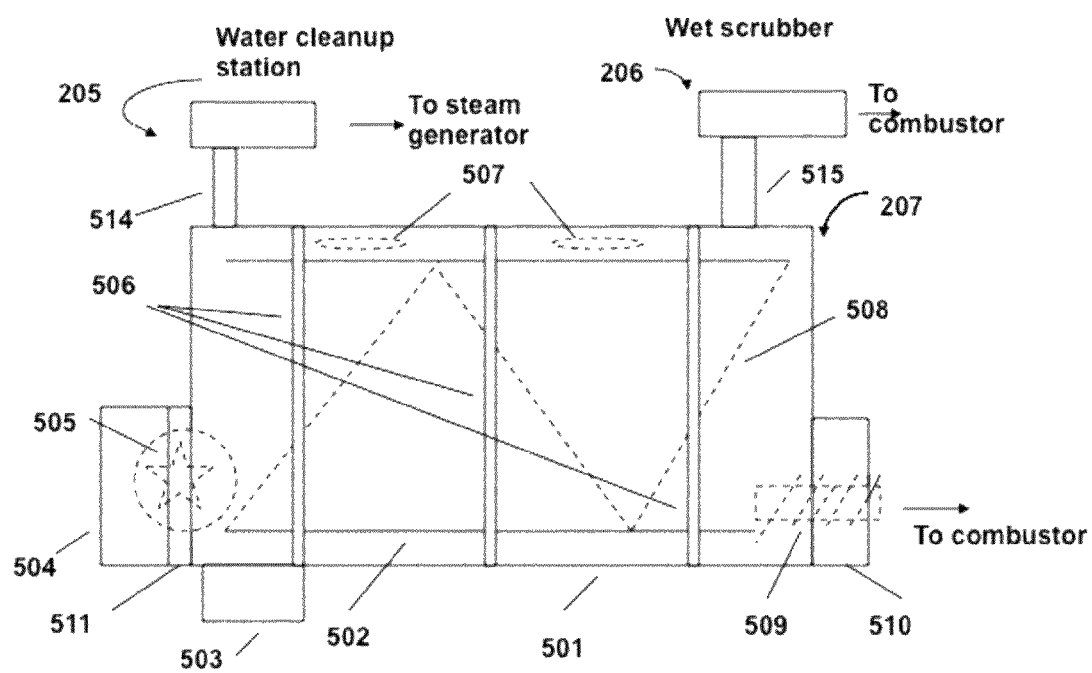
FIG. 5a show a side view of the kiln used for pre-processing the coal and bio fuels prior to chemical looping combustion.

FIG. 5a in 500 shows details in a side view of kiln 207, water cleanup station 205 and wet scrubber 206. Kiln 207 consists of an outer shell 501 and has a concentrically mounted, rotatable inner core 502. Kiln shell 501 has heater coils 506 wrapped around its outer surface. Heat sensors 507 are mounted in the annular space between inner core 502 and outer shell 501. Kiln rotation mechanism 503 is further described in FIG. 5b. In FIG. 5a an airlock 505 mounted at the proximal end of shell 501 admits the contents of coal and biomass in hopper 504. Airlock 505 and char ejection screw drive 509 prevents air (oxygen) from entering kiln core 502 so that the kiln is anaerobic and can be heated above the temperature of ignition of the resident coal and biomass without combustion. A helical steel rail 508 mounted onto the inner surface of kiln core 502 causes the contents of kiln core 502 to move from proximal to distal ends upon rotation of kiln core 502. Char ejection screw drive 509 is mounted at the distal end of inner kiln shell 501 serving to discharge the pre-processed coal and biomass from kiln core 502 for delivery to the chemical looping combustor 211. Open flange 511 at the proximal end of kiln shell 501 connects kiln shell 501 and kiln core 502 to hopper 504 in conjunction with airlock 505. At the distal end, flange 510 fixedly attached to outer shell 501 and outer shell 501 to eject the solid contents of kiln core 501. Duct 514 connects the proximal end of the kiln shell 501 for drawing off water vapor to the clean-up water station 205 (shown in FIG. 2), while duct 515 connects the distal end of kiln 501 to the wet scrubber for separation of contaminants from the hydrocarbon output 208 of wet scrubber 206 that goes to chemical looping reactor 211.

Figure 5B:
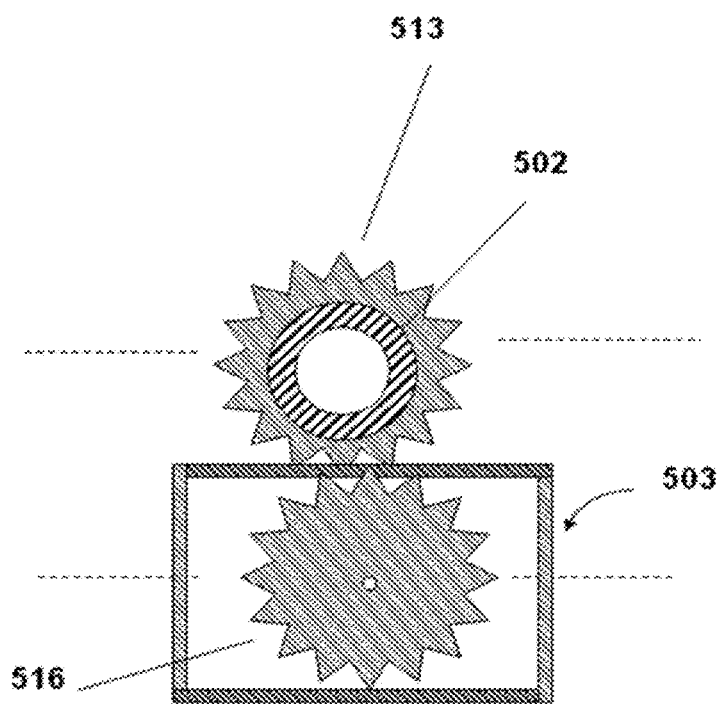
FIG. 5b shows a part of the kiln in cross section along with a motor drive to provide rotation of the kiln during pre-processing of the coal and biomass.

FIG. 5b shows a cross section of the kiln rotation mechanism 503. Gear 516 is attached to a motor (not shown) and engages gear 513 that is fixedly attached to the outer circumference of kiln inner core 502.

Given this disclosure it will become apparent to one skilled in the art that alternative equivalent embodiments are possible such as the wet scrubber 206 can be replaced by activated charcoal filters.

These equivalent embodiments are also within the contemplation of the inventors.

I claim:

1. A system for pre-processing coal and biomass, said system comprising a rotary kiln capable of heating of coal and biomass in an anaerobic environment; a water cleanup station positioned near the proximal end of said kiln for drawing off and treating water vapor emanating from said coal and biomass; a wet scrubber, said scrubber positioned near the distal end of said kiln for drawing off contaminants and hydrocarbons from said coal and biomass in said rotary kiln separating said contaminants from said hydrocarbons by means of said wet scrubber or activated carbon filter; and delivering said pre-processed coal and biomass to a reactor for chemical looping combustion.

2. A method for pre-processing coal and biomass, said method comprising the steps of: heating coal and biomass in an anaerobic rotary kiln; drawing off water vapor emanating from said heated coal and biomass by means of a water cleanup station, said station positioned near the proximal end of said kiln; drawing off contaminants and hydrocarbons from said rotary kiln into a wet scrubber, said scrubber positioned near the distal end of said kiln; separating said contaminants from said hydrocarbons by means of said wet scrubber or activated carbon filter; and delivering said hydrocarbons and pre-processed coal and biomass to a reactor for chemical looping combustion.

* * * * *